UNITED STATES PATENT OFFICE.

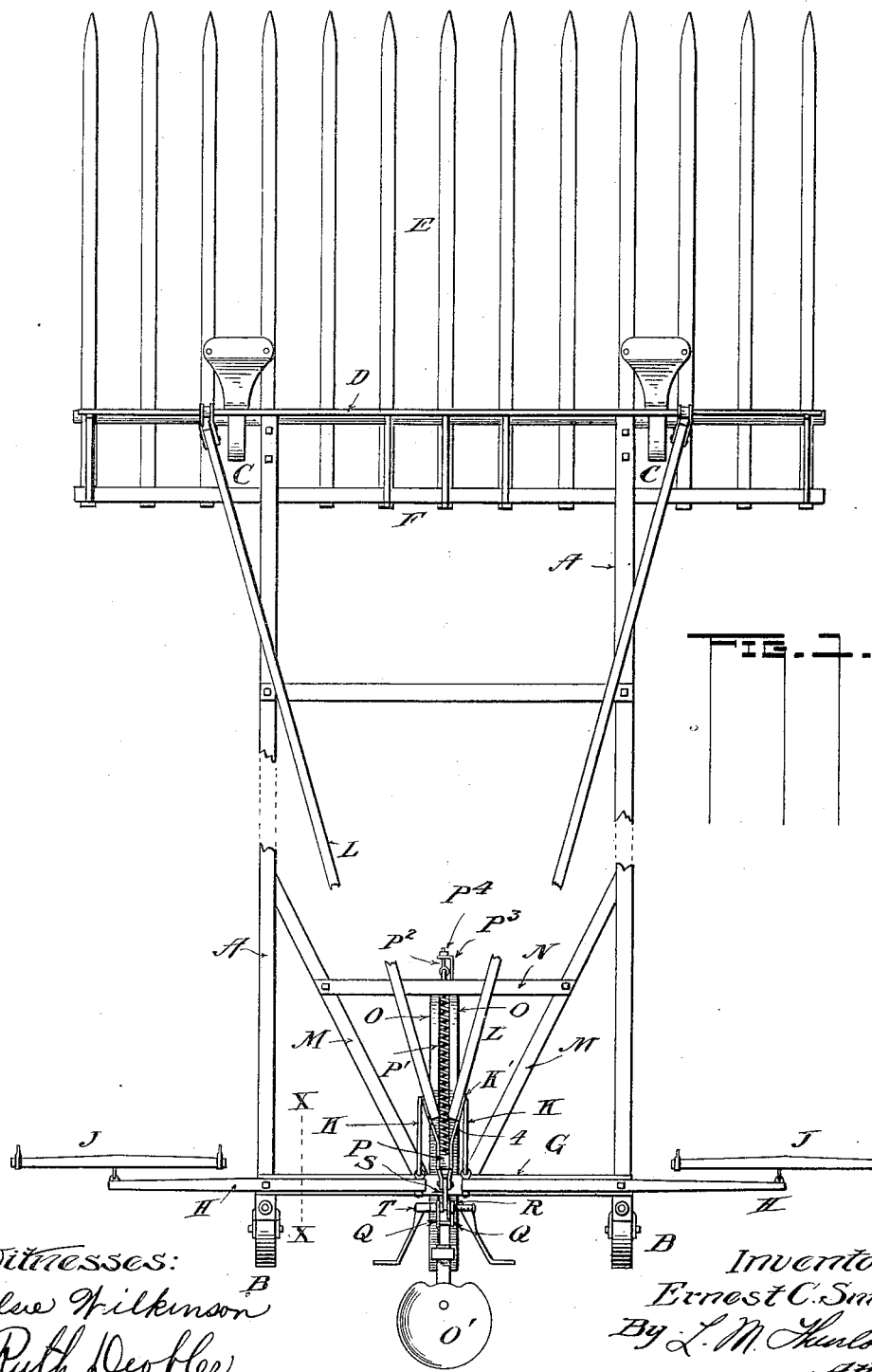

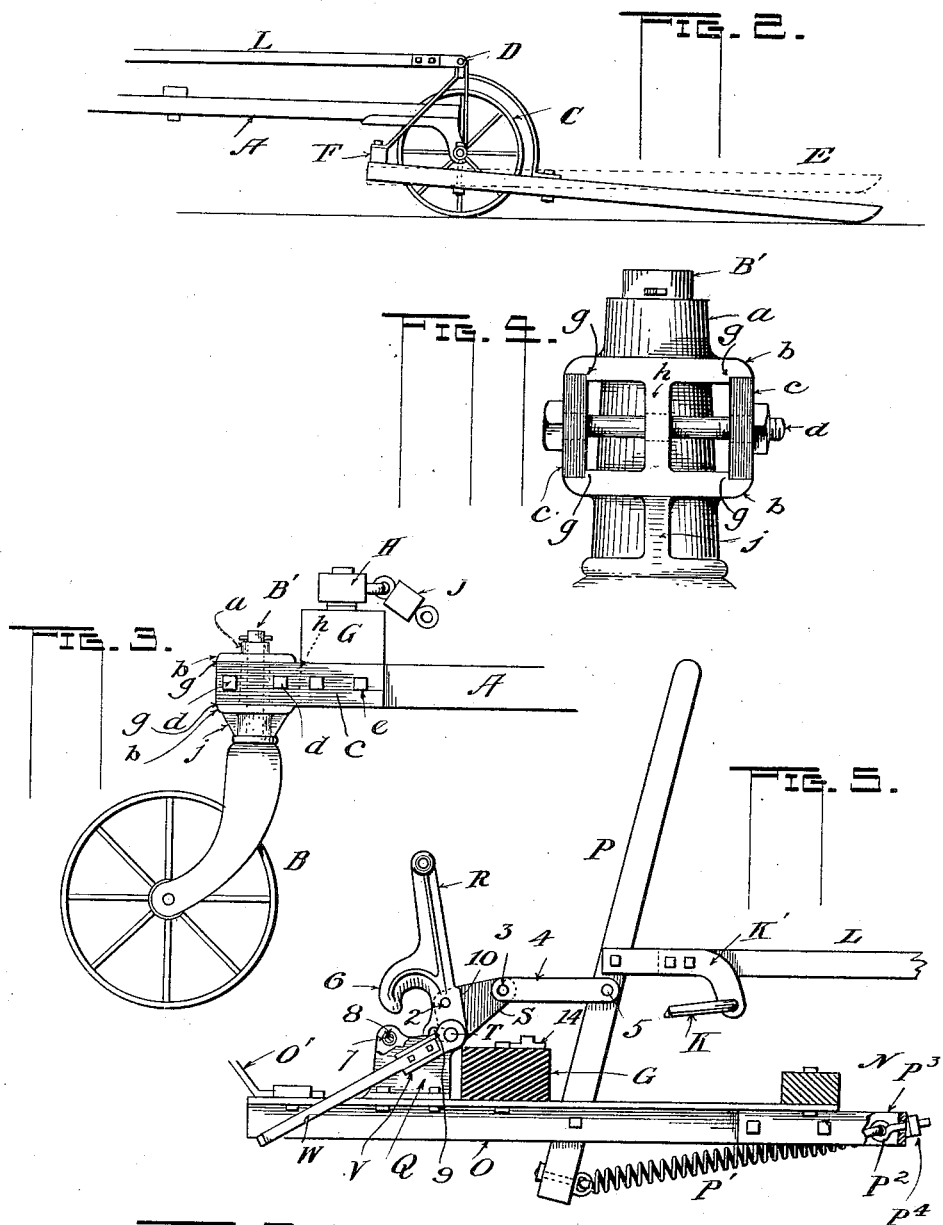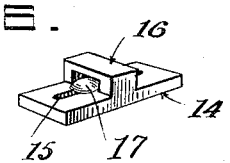

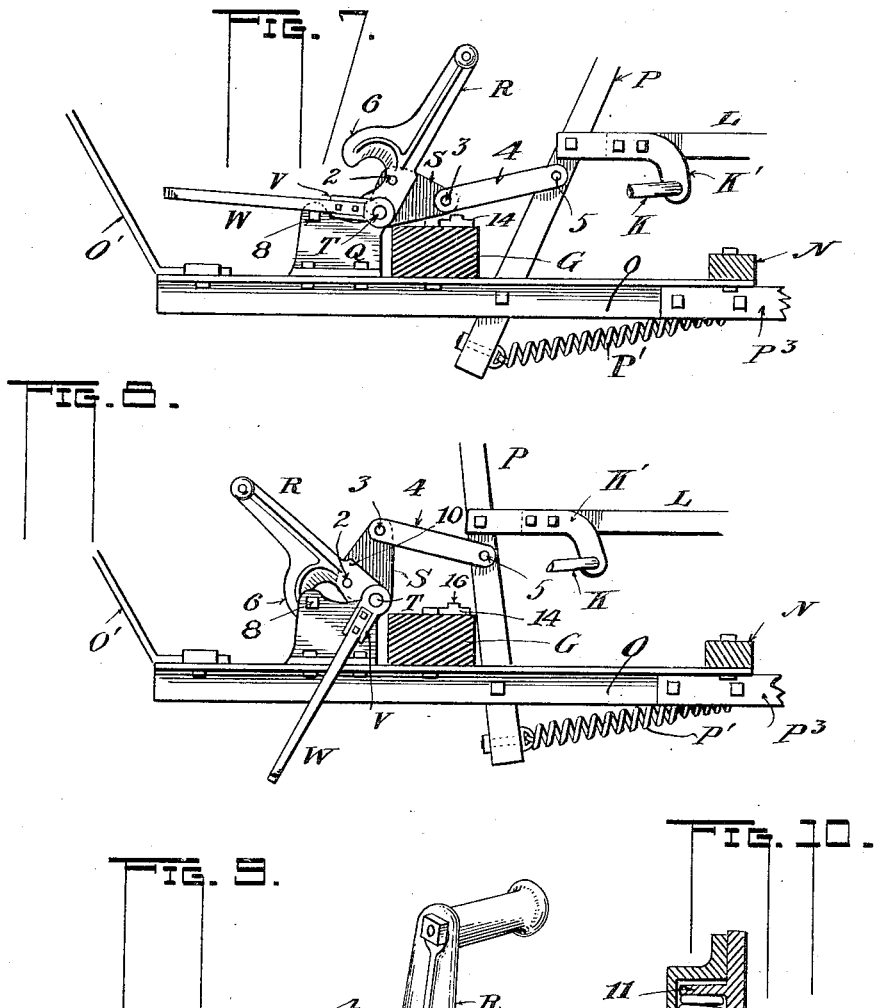

ERNEST C. SMITH, OF PEORIA, ILLINOIS, ASSIGNOR TO ACME HARVESTING MACHINE CO., OF PEORIA, ILLINOIS, A CORPORATION OF WEST VIRGINIA.

PUSH-RAKE.

1,130,032.   Specification of Letters Patent.   Patented Mar. 2, 1915.

Application filed July 20, 1911. Serial No. 639,677.

*To all whom it may concern:*

Be it known that I, ERNEST C. SMITH, citizen of the United States, residing at Peoria, in the county of Peoria and State of Illinois, have invented certain new and useful Improvements in Push-Rakes; and I do hereby declare that the following is a full, clear, and exact description of the invention, which will enable others skilled in the art to which it appertains to make and use the same.

This invention relates to that class of farming tools known as rakes and particularly of the push-rake type or in which the rake teeth are arranged in front of the horses.

The primary object of my invention is to provide a structure by which the rake teeth can be raised with a minimum of effort on the part of the operator.

Another object is to provide a structure which results in the easy lifting of a loaded rake head with a minimum of effort and at the same time will have provision for positively holding the points of the teeth upon the ground including provision for permitting what might be called a floating action of said teeth.

Another object of the invention is to provide a peculiar form of latching means for holding the teeth in a raised position. And besides the above objects the invention relates to certain details of construction that will appear herein aided by the accompanying drawings, in which:—

Figure 1 is a plan of a rake including my invention. Fig. 2 is a side elevation of the forward end of the rake. Fig. 3 is a rear elevation of part of the rake frame and a caster wheel drawn on a much larger scale. Fig. 4 is a rear elevation of a casting to hold a caster wheel and shown on a still larger scale. Fig. 5 is a side elevation of the operating parts used for lifting the rake head. Fig. 6 shows an attachment for the machine frame in perspective. Fig. 7 is a view similar to that in Fig. 5 showing the parts in a slightly different position. Fig. 8 is the same shown in another position. Fig. 9, in perspective, shows some of the working parts, and Fig. 10 is a sectional elevation of two of the parts shown in Fig. 9 taken on line X X of that figure.

It is well known to those familiar with rakes of this type that many, if not all of them, are almost unmanageable in that the system of leverages is so arranged that the strength of the operator is taxed to the utmost to raise the rake teeth especially when loaded. But even when there is no load on the teeth the operator is called upon to exert great effort in handling the tool. It is with this in view that I have devised a structure requiring but very little effort on the part of the operator, great assistance being furnished him by the pull of the horses which, however, is not new in itself, and by a spring all of which will be brought out herein.

The frame of the rake is composed of two members A supported at their rear ends upon caster wheels B, and at their forward ends upon wheels C in any usual or preferred manner. In the present instance the members are secured on a bar D extending across the rake head made up of the teeth E and the cross member F. The rake head is preferably suspended from the said bar D so as to pivot thereon whereby the teeth can rock vertically as is customary.

G is a cross-bar connecting the rear ends of the frame members A and upon each end of this is pivoted a double-tree H, the outer end of each of which carries the usual swingle tree J. The inner adjacent ends of the double trees are connected through links K to a reach consisting of connecting-rods L whose forward ends are pivotally secured to a part of the rake head in any usual manner by means of which the rake-teeth may be tilted vertically. The said links K are attached to the said reach by means of straps K′ preferably though other means may be employed.

M M indicate two braces attached at their ends to the frame members A and the cross bar G before described, and N is a cross bar attached at its ends to said braces. Secured at one end to the underside of the latter and preferably centrally of the machine is a pair of angle bars O whose rear ends are suspended from the cross-bar G and support a seat O′ at the rear extremities.

Erected between and pivoted to the angle bars O is a hand lever P having pivotal connection with the reach L L through the straps K′ before referred to. Attached to the lower end of the lever below its pivot is one end of a contractile spring P′ connected at its other end to an adjustable eye bolt P² which extends through a bracket P³ attached to one of the angle bars O there being a nut P⁴ for adjusting said eye bolt to vary the tension of said spring.

Mounted upon the two angle bars O immediately behind the cross bar G are two upright castings Q lying parallel to one another and spaced apart to admit a foot lever R, and a rock-arm S carried by and secured to a rock-shaft T, by means of a pin U, Fig. 10, said rock-shaft having its bearings in both the members Q and extending beyond each side of them as shown, each having fixed thereon a casting V to each of which is attached a foot lever W. The rock-arm as shown in the present instance is triangular in form and one of its three corners receives the shaft T mentioned, while at one of the other corners this member is pivoted to the foot lever R by means of a bolt 2. The third corner of the triangle receives a bolt 3 which serves to connect said triangle by means of two links 4 with the hand lever P, a bolt 5 serving as the means to attach the links to said lever. The foot lever R at its rear is provided with a hooked latch 6 adapted to engage a stop 7 fixed between the members Q. In practice this said stop 7 preferably consists of a short piece of tubing through which passes a bolt 8 which extends through both members Q as shown in Fig. 9. The lever R is provided with a slot 9 which is described from the pivot bolt 2 and the forward edge of said lever has a projection 10 which, as shown in Fig. 10, carries a lug 11 at its side adjacent the rock-arm described. The latter has cast with it a barrel 12 within which said lug 11 extends there being a compression spring 13 in said barrel one end resting upon the bottom of the latter the other exerting pressure upward against the lug 11. The said spring in exerting its pressure upon the lug 11 and in lying at one side of the bolt 2 causes the foot lever to tilt so that its hook always has a downward tendency.

In the raking position the parts assume the position shown in Fig. 7. The foot lever R and the hand lever P occupy the forward position while the foot levers W are raised to a position where full power can be exerted downward upon them from the operator's seat. When the levers occupy this position the rock-arm S preferably may rest upon an anvil 14, Fig. 6, secured on the cross-bar G. This consists of a member slotted at 15 and having a vertically extending portion 16 arching over said slot and which receives said rock-arm S. Said anvil is adjustable laterally on the said cross bar and is secured in position by means of a bolt 17 passing through its slot. When the hand lever P and the other parts occupy the forward position the reach L L is also in the forward position with the teeth E of the rake bearing upon the ground as a natural consequence. Assuming now that the teeth are to be lifted with a load the operator grasps the hand lever P to draw it rearward and at the same time depressing the foot levers W. This, aided by the pull of the spring P', and that of the horses through the swingle trees and the links K, draws the reach L L backward to the position shown in Fig. 8. However in practice I have found that by adjusting the tension of the spring the teeth under normal conditions can be raised by it and the horses without any help from the operator whatever so that as a matter of fact except for the other uses described the lever mechanism could be dispensed with still being available as an aid. During this backward movement the point of the latch 6 of the lever R meets the stop 7 at about the position shown in Fig. 9 and moves the said lever on its pivot bolt 2, this being permitted by the slot 9 of said lever. This compresses the spring 13 and as the latch passes over said stop 7 the said spring causes it to drop down behind or beneath said member automatically retaining the parts in that position. Since this action of the parts may be entirely automatic the operator may give his whole attention to guiding his horses. When it is desired to lower the rake teeth it is only necessary to "kick off" the lever R to remove its latch 6 from the stop 7 after which by pushing said lever forward, aided by the hand lever P, the teeth are lowered and the spring P is put under increased strain ready for a succeeding lifting operation. In lifting the lever R in the unlatching operation just mentioned it is moved on the pivot-bolt 2 to the position shown in Fig. 5, the shaft T then lying in the forward part of the slot 9 so that the said shaft becomes a fulcrum for the said lever. Now, the rock-arm S in being fixed on said shaft is forced downward by the bolt 2 so that its end having the links 4 is placed upon the anvil 14. The anvil is adjustable longitudinally of the machine or in line with the direction of advance. This is done to limit the degree of depression of the rock-arm S. That is to say, in one of the positions as, for instance in Fig. 7, the connecting bolt 3 has been forced down below a line extending between the bolt 5 and the shaft T constituting a toggle and forming a lock so that pressure in a rearward direction from the reach due to the pull of the horses through the links K would tend rather to force the bolt 3 still lower but in any case this pressure could not in any way change the adjustment of the parts. Evidently, the bolt 3, i. e. the point of connection of the parts 4 and arm S, may also be made to pass below a line extending through the point of connection of the reach L with the rake-head and the pivot shaft T of the arm S to accomplish the intended result in the event that the reach were a single member connected directly to and between the said rake-head and said arm S and where the lever P might not be used as above stated. However, in practice it is preferable to permit the points of the teeth to rise and fall as they move along the ground when meeting obstructions so that breakages would not be likely as might result if the parts were not allowed to yield. The anvil 14, therefore, if set nearer the lever R than shown in Fig. 7 would not permit the end of the arm S to descend as low as shown and the pivot bolt 3 can be made to lie a little above the line referred to. In striking an obstruction the teeth will now be allowed to rise but the foot of the operator maintains a steady pressure upon the lever R or such as to overcome the tension or pull of the spring P' and the pull of the horses that might be sufficient to partially raise the teeth. But the center of the pivot bolts 3 and 5 and the shaft T are, of course, kept so nearly in line that these stresses are slight as compared with that at the time the teeth are being raised and when the rock-arm S and the links 4 assume positions substantially at right angles as shown in Figs. 5 and 8. The lever R is slotted about the shaft T merely to allow it to lock behind the stop 7 by means of its hook but other means of providing for latching the lever may, of course, be resorted to, it being understood that as the spring 13 is placed at one side of the pivot-bolt 2 of the lever R the latch 6 must always meet the stop 7 as the lever moves toward it.

As stated herein the disadvantage of previous structures in rakes of this type is the extreme effort required of the operator to raise the loaded rake-head even when assisted by the pull of horses; the structures being such as to aid very little in this effort. Again, when lowering the rake teeth almost the same effort is required in preventing the rake head "slamming" upon the ground. Besides this in many implements the position of the parts relatively is such as to be almost dangerous to handle. In my improved structure I am enabled to lift the rake with extreme ease even without the aid of the horses which is an impossibility in some of the older types. I do not confine myself to the exact structures or arrangement of parts, however, since slight variations may be made that will still lie within the meaning of the invention.

Figs. 3 and 4 show a novel form of casting. It is employed at the rear end of the frame A and forms a very convenient fitting for the caster-wheel B. It comprises a central vertical hub-portion bored to receive the stem B' of the wheel. It also has an upper and lower horizontal web b spaced apart and shouldered at g to receive the ends of bars c secured by bolts d. The other ends of the bars are secured to the frame A for instance by bolts e. Cast with the webs b are vertical webs h at the front and rear, and other webs j below are provided for strengthening purposes. This furnishes a very convenient and strong arrangement in a single piece that aids materially in shortening the time required to assemble the parts of the rake.

The form of the rake frame at its rear end I believe is new and novel. I mount upon the angled members M the cross-member N and attach to it and the bar G the bars O, or their equivalent, upon which the seat O' is supported. This makes a strong structure and the said bars A form a convenient way of mounting the operating parts and said seat and the latter can be adjusted along said bars to the best position to accommodate a tall or short person so that the levers can be readily reached.

In some of the claims I shall use the term "reach structure." By this I mean the reach L and the hand lever P together with the parts 4, the hand lever being an intervening part of the reach structure. Evidently, the reach L could be attached directly to the rock arm S. The lever P could then have attachment to it in some manner other than that shown whereby it could swing in an arc described from its pivot on the frame O without interfering with the movement peculiar to the reach.

Having thus described my invention, I claim:—

1. In a push rake, the combination of a wheeled main frame, a rake head pivoted to the forward end of the frame, a rock arm pivoted on the frame, a reach structure connecting the arm and rake-head, a fixed stop, and a latch carried by and movable with the arm and engaging the stop.

2. In a push rake, the combination of a main frame, a rake-head pivotally supported at its forward end, a rock-arm pivotally mounted on the frame, a reach structure connecting the rake-head and the rock-arm, a stop on the frame, a latch carried by the rock-arm to engage the stop, and a foot lever fixed relatively to the said rock-arm.

3. In a push rake, the combination of a main frame, a rake-head pivoted at its forward end, a rock arm pivotally mounted on the frame, a reach structure connecting the latter with the rake-head, a lever pivoted to the arm, means to limit its pivotal movement thereon, a stop on the rake frame, and a latch on the said foot lever to engage the stop.

4. In a push rake the combination of a main frame, a rake-head pivoted at its forward end, a rock arm pivoted on the frame, a reach structure pivoted to the arm at one end and to the rake-head at the other, the point of connection of the reach structure and the arm in the gathering position of the rake teeth lying below a line extending through the point of connection of said reach structure and rake head and the supporting pivot of the arm, and an adjustable stop beneath the same to receive the same.

5. In a push rake, the combination of a main frame, a rake-head pivoted at its forward end, a rock arm pivotally mounted on the frame, a reach structure connecting the arm and the rake-head, a member pivoted to the arm and including a part to limit its movement relative thereto and also including a depending latch, and a stop lying in the path of said latch and engaged by it.

6. In a push rake, the combination of a main frame, a rake-head pivoted at its forward end, a rock-arm pivotally mounted on the frame, a reach structure connecting the arm and the rake-head, a member pivoted relative to the arm and including a part to limit its movement with respect thereto and also including a latch, a stop, and means to elastically hold the latch at one of its extreme positions and in position to engage the said stop.

7. In a push rake, the combination of a main frame, a rake-head pivoted at its forward end, a rock arm pivotally mounted on the frame, a reach structure connecting the arm and rake-head, a member pivoted to the arm and adapted to pivot relatively thereto parallel to the plane of its own movement, said member including a part to limit its pivotal movement on the arm and also including a latch, a stop lying in the path of the latch as it moves with the arm, and a spring to hold the latch in position to meet said stop.

8. In a push rake, the combination of a main frame, a rake head pivoted at its forward end, a rock arm pivotally mounted on the frame, a reach structure connecting the arm and rake-head, a member pivoted to the arm and adapted to rock thereon substantially parallel to the direction of the pivotal movement of said arm, said member including a part to limit its pivotal movement relatively to the latter, and also including a latch, a stop lying in the path of the latch as it moves with the arm, a spring to hold the latch in position to meet said stop, and a foot lever extension on the arm.

9. In a push rake, the combination of a main frame, a rake head pivoted at its forward end, a rock arm pivotally mounted on the frame, a reach structure connecting the arm and rake-head, a member pivoted to the arm and adapted to rock thereon substantially parallel to the direction of the pivotal movement of said arm, said member including a part extending below its pivot and provided with a slot, a part on the frame to engage in the slot and limit the movement of the member, said member also including an integral latch portion, a stop with which the latch engages, and a spring engaging the member and constantly tending to hold its latch portion in the direction of the stop, said member also including a lever portion uprising therefrom.

10. In a push rake the combination of a main frame, a rake-head pivoted at its forward end, a lever pivoted on the frame, a reach connecting the lever and the rake head, a rock arm pivoted on the frame and including a lever as a part thereof, means to limit the arm in its downward movement, and a member connecting with said arm and the first named lever, the point of connection of the said member with the arm lying below a line extending through the supporting pivot of the said arm and the point of connection of the member and the lever when the rake teeth are in the lowest position.

11. In a push rake, the combination of a main frame, a rake-head pivoted at its forward end, a rock arm pivoted on the frame, a two part reach connected between the arm and the rake-head, a lever pivoted on the frame and having the two parts of the reach pivoted to it, the rock-arm being limited in its downward movement and forming a lock through the reach to hold the rake teeth down at their points, a draft device pivoted between its ends to the main frame for the attachment of a draft animal at one end, and means connecting its other end with the said reach.

12. In a push rake the combination of a main frame, a rake-head pivoted at its forward end, a rock arm pivoted on the frame, a lever also pivoted on the frame between the rake-head and the arm, a two-part reach connected to the lever, one of the parts being connected to the rake-head and the other to the arm, means to limit the rock arm in its downward movement and the two-part reach and the arm adapted for forming a lock to hold the rake teeth down at their points, a draft device pivoted between its ends to the main frame for the attachment of a draft animal at one end, means connecting its other end with the said reach, and a spring attached at one end to the lever and at its other end to the main frame and constantly tending to lift the rake-teeth.

13. In a push rake, the combination of a main frame, a rake-head pivoted at its forward end, a rock-arm pivoted on the frame, a reach structure connecting the rake head and the rock arm, the latter being limited in its downward movement by the frame, a draft device pivoted to the frame between its ends rearward of the arm, for the attachment of a draft animal at one end, and means connecting the other end of the draft device with the reach, the rock arm due to its limit of downward movement adapted to hold the rake teeth upon the ground in opposition to the pull of the draft device upon said reach.

14. In a push rake, the combination of a main frame, a rake head pivoted at its forward end, a lever pivoted on the frame rearward of the head, a reach connecting the lever and head, a rock arm including a lever pivoted to the frame, a link connecting the arm and lever, the link and arm constituting a toggle lock, a stop beneath and for receiving the toggle and limiting its downward movement, a spring connecting the lever to the main frame and constantly tending to lift the rake teeth through the said lever, a draft device pivoted on the frame rearward of the lever, means to connect one end of the said draft device with the reach, a latch attached to the arm, and a stop in the path of the latch to receive the same.

15. In a push rake, the combination of a main frame, a rake-head pivoted at its forward end, a lever pivoted on the frame rearward of the head, a reach connecting the lever and head, a rock arm including a lever pivoted to the frame, a link connecting the arm and first-named lever, the link and arm constituting a toggle lock, a stop beneath and for receiving the toggle and limiting its downward movement, a spring connected between the said first-named lever and the main frame and constantly tending to lift the rake teeth through the said lever, a draft device pivoted on the frame rearward of the lever, means to connect one end of the said draft device with the reach, a latch attached to the arm, a stop in the path of the latch to receive the same, and a spring engaging the latch to hold it in the direction of the stop.

16. The combination in a hay rake, of its main frame and a liftable rake-head, a foot lever pivoted on the frame including an arm, reach mechanism connecting the arm and the rake-head, a member pivoted between its ends to said arm and having an opening spaced from its pivot, means on the frame lying within the opening and limiting the pivotal movement of the member relative to the arm, a stop fixed relative to the frame, and a latch constituting an integral part of the member adapted in its movement to engage the stop.

17. The combination in a hay rake, of its main frame and a rake-head, an arm pivoted on the frame including a foot lever extension, reach mechanism connecting the arm and the rake-head, a member pivoted on said arm including an integral part constituting a latch, means to limit the movement of the member relative to the arm, and a stop on the frame lying in the path of the latch with which the latter in its movement with the arm is adapted to automatically engage.

18. The combination in a hay rake, of its main frame and a rake-head, an arm pivoted on the frame, reach mechanism connecting the arm and the rake-head, a member pivoted on said arm including an integral part constituting a latch, means to limit the movement of the member relative to the arm, a stop on the frame lying in the path of the latch with which the latter in its movement with the arm is adapted to automatically engage, and means to hold the latch yieldingly in the path of the stop.

19. The combination in a hay rake, of its main frame and a rake-head, an arm pivoted on the frame including a foot lever extension, reach mechanism connecting the arm and the rake-head, a member pivoted on the arm and including a foot lever extension above its pivot, means to limit the pivotal movement of the member relative to the arm, a stop on the frame, and a latch rearward of the pivot of said member constituting an integral part of the latter and adapted in its path of movement to engage the stop and maintain the parts in a fixed position relative to the frame.

20. In a latch mechanism for a hay rake, a pivotally mounted manually operated arm having a weight to be lifted attached thereto, a manually operated member pivoted to the arm including an integral latch, means to limit the movement of the member, a stationary stop lying in the path of the latch, and means to hold the member elastically in one of its extreme positions for engaging the stop.

In testimony whereof I affix my signature, in presence of two witnesses.

ERNEST C. SMITH.

Witnesses:
W. I. SLEMMONS,
L. M. THURLOW.